United States Patent [19]

Airhart

[11] 4,402,381
[45] Sep. 6, 1983

[54] VEHICLE MOUNTING AND DEPLOYMENT ARRANGEMENT FOR SEISMIC SOURCE

[75] Inventor: Tom P. Airhart, Plano, Tex.

[73] Assignee: Atlantic Richfield Company, Los Angeles, Calif.

[21] Appl. No.: 219,732

[22] Filed: Dec. 24, 1980

[51] Int. Cl.³ .................... G01V 1/047; G01V 1/09
[52] U.S. Cl. ................................. 181/114; 181/117; 181/121; 124/56
[58] Field of Search ............ 181/119, 114, 117, 121; 124/56-58

[56] References Cited

U.S. PATENT DOCUMENTS

| 4,011,923 | 3/1977 | Talke et al. | 181/114 |
| 4,056,164 | 11/1977 | Johnston | 181/114 |
| 4,135,598 | 1/1979 | Stafford | 181/114 |
| 4,316,521 | 2/1982 | Chelminski | 181/119 |

FOREIGN PATENT DOCUMENTS

| 830264 | 5/1981 | U.S.S.R. | 181/114 |

Primary Examiner—Nelson Moskowitz
Attorney, Agent, or Firm—Robert M. Betz

[57] ABSTRACT

A transportable, acoustic pulse generator is described employing an impact mass suspended above a freely movable target plate positionable on the ground, the impact mass being forceably propelled downwardly to strike the target plate to generate an acoustic pulse adapted for seismic purposes. The generator housing is adapted to be mounted on the rearwardly extending rails of a conventional transport truck. In order to eliminate bouncing of the truck due to generator housing recoil on firing, the housing itself is jacked up by lift cylinders extending upward from the target plate so as to minimize or eliminate the spring suspension of the truck. Upstanding sleeve guides carried on the generator housing cooperate with the lift means to provide lateral stability and to establish a precise vertical separation between the impact mass and the target plate, thus insuring repeatable signal energy content and timing.

5 Claims, 2 Drawing Figures

VEHICLE MOUNTING AND DEPLOYMENT ARRANGEMENT FOR SEISMIC SOURCE

BACKGROUND OF THE INVENTION

1. Field of the Invention

This invention relates generally to the field of seismic prospecting and more particularly to transportable apparatus for injecting an acoustic pulse into the earth.

2. Description of the Prior Art

The invention to be described constitutes an improvement in transportable acoustic pulse generators of the type generally disclosed and illustrated in commonly-assigned, U.S. Pat. No. 4,284,165 entitled Acoustic Pulse Generator and filed Dec. 28, 1979. The generator described therein includes an upstanding cylindrical housing within which an impact mass is slidably supported in an upper firing position by an electrically controlled latch. A target plate is positioned on the ground beneath and spaced from the impact mass. Compressed gas is provided from high volume accumulators interconnected with large area ports penetrating the side wall of the housing near its top, the ports being normally blocked by the piston. Quick release of the latch admits gas within the housing through the ports, triggering the downward thrust of the impact mass to strike the target plate and to thereby generate an acoustic pulse.

In this prior art device the housing is adapted to be mounted in fixed relation to the framework of a transporting vehicle such as a truck. Experience has shown that the upward recoil force exerted against the housing as a result of the operation of the generator may cause the transporting truck to bounce on its spring suspension, with consequent danger of upset or damage to both truck and generator. This is of particular concern with impacting type generators which develop high kinetic energy or in cases where the device is being operated on rough, uneven terrain.

It is therefore a general object of the present invention to provide an acoustic pulse generator of the type described with improved means for mounting the generator on a transporting vehicle and for deploying the generator in a firing position.

It is a more particular object of the present invention to provide improved means for deploying a transportable acoustic generator of the type described wherein means are provided for minimizing lateral instability of the entire system.

With further reference to prior acoustic pulse generators of the type described, it has been found desirable to repeatably produce pulses of constant energy content. The energy developed depends upon the attained kinetic energy of the impacting mass or piston at the moment of contact with the target plate. If the driving gas pressure is held relatively constant, which is quite easily accomplished, this kinetic energy is a function of the distance that the impact piston travels. Thus it is important to insure that this distance does not vary from shot to shot. If the target plate rests on relatively soft ground, or tends to sink after several shots, this distance will tend to vary unless corrective measures are applied. More importantly, repeatable time delays from radio controlled trigger release to impact of the driven mass upon the target plate are required to simultaneously operate multiple sources or in a desired coded sequence. Constant energy content is also dependent upon maintenance of proper alignment between impact mass and target plate. If at any stage in the firing sequence this alignment is altered, the target plate may not receive a direct blow.

It is therefore a still further object of this invention to provide deployment means for a transportable acoustic pulse generator wherein impact mass travel distance remains constant from shot to shot, and proper mass to target alignment is maintained.

These and further objects and advantages of the present invention will become apparent from a consideration of the detailed description and drawings to follow.

SUMMARY OF THE INVENTION

In accordance with the preferred embodiment of this invention a transportable acoustic pulse generator includes an upstanding housing fixed to the guide walls of a transport truck. The housing includes a centrally-located, hollow, cylindrical firing tube adapted to slidably receive the upper end of an elongated impact mass or piston. Near its closed upper end of the side wall of the firing tube is penetrated by ports communicating with a source of compressed gas, these ports being sealed off by the piston in its upper, ready position above ground. A target plate is positionable on the ground beneath the lower end of the piston so that, upon release, the piston is driven explosively downward by the compressed gas to impact the target and produce an acoustic pulse of interest. Fixed to the housing on either side of the firing tube are upstanding telescoping lift cylinders, whose upper ends are pivotally connected to mounting brackets extending radially from the firing tube. The piston rods of these cylinders are extendable downwardly by hydraulic or pneumatic force to contact the upper surface of the target plate. When the generator is to be deployed for operation the piston rods of the lift cylinders bear downwardly against the target plate and produce a corresponding upward thrust on the generator housing. Thus the lift cylinder acts as a jack with the target plate as a base. In this manner the full housing weight is brought to bear directly on the target plate. If the generator is mounted on truck rails behind the rear tires, this in turn tends to lift the truck off its rear spring suspension and ultimately raises the rear tires off the ground. In that position the weight of the truck itself additionally bears on the target plate.

Adjacent to and parallel to the previously described lift cylinders there are a corresponding pair of telescoping guides each consisting of an outer upstanding open ended sleeve affixed to the radial mounting brackets and an inner guide shaft slidable within the sleeve, having its lower end rigidly interconnected with the bottom end of one of the lift cylinder piston rods. The top of each guide shaft is provided with a flange which limits the relative travel of the guide shaft and its sleeve. This in turn limits the travel of the piston rod of the associated lift cylinder. The sleeve guides accomplish two distinct purposes. First, they insure that in deployment of the generator, lateral forces against the lift cylinders do not cause their failure, particularly in their extended and most vulnerable position. Secondly, as the lift cylinders are extended and the weight of the housing and the truck are brought to bear directly down on the target plate the flange on the sleeve guide shaft provides a positive stop. Since the impact mass in its upper ready position in the firing tube always has the same vertical relation to the generator housing, this in turn establishes a fixed, repeatable separation distance between the impact mass and the upper surface of the target plate.

DESCRIPTION OF THE PREFERRED EMBODIMENT

Figure 1:
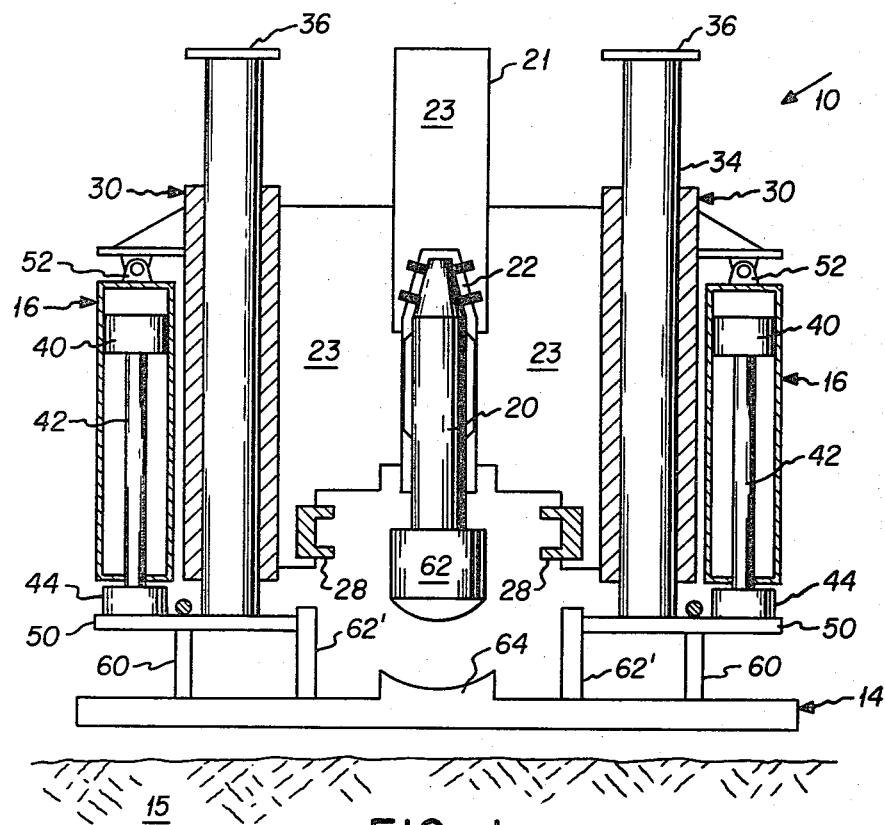
FIG. 1 is a vertical sectional view of an apparatus in accordance with the preferred embodiment of this invention prior to deployment from a transport vehicle.
Figure 2:
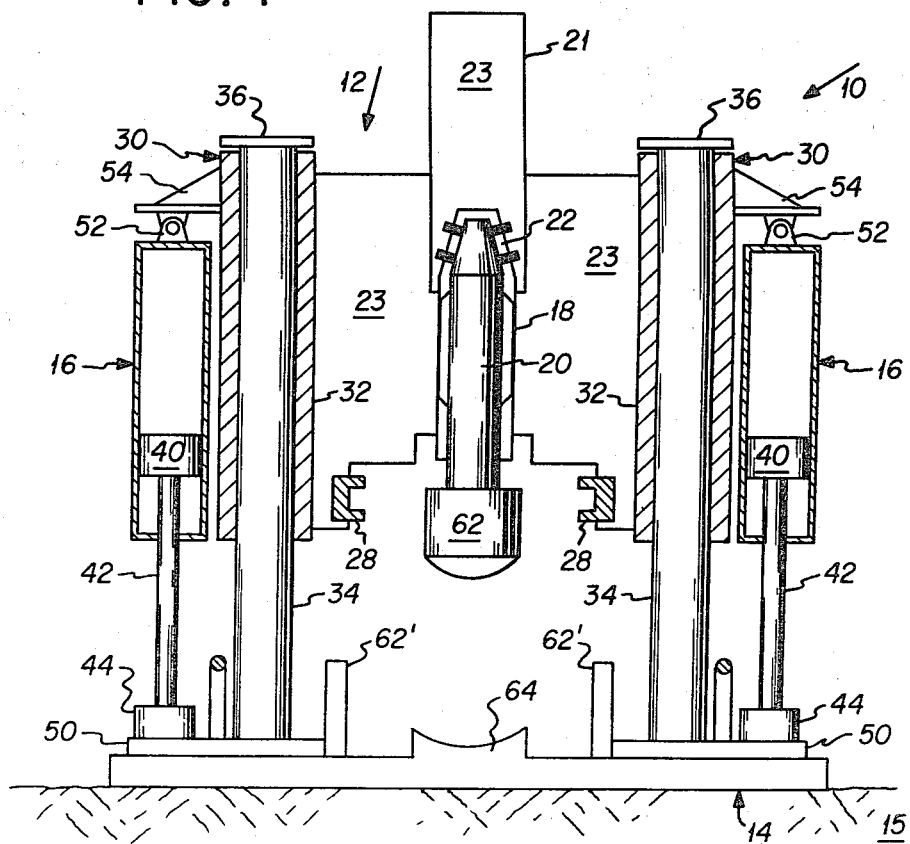
FIG. 2 is a vertical sectional view of the apparatus of FIG. 1 in its deployed mode ready for firing.

With reference now to FIGS. 1 and 2, there is illustrated an acoustic pulse generator apparatus 10 in accordance with the preferred embodiment of this invention. The apparatus 10 consists generally of a housing 12 adapted to be fixed to a transport vehicle (not shown), a wide area ground contacting target plate 14 positionable on the ground 15 beneath the housing 12 and a pair of upstanding, telescoping lift cylinders 16 adapted to extend between the housing 12 and the target plate 14.

More particularly, the housing 12 is provided with a central firing tube 18 adapted to receive the upper end of an impact piston 20. An accumulator 21 communicates with firing tube 18 through suitable valving means, such as side wall ports 22. In operation, piston 20, normally supported by latching means (not shown), is driven down by the force of the pressure of the gas 23 admitted from accumulator 21 through ports 22. Suitable means for returning piston 20 to its ready position are shown and described in the above-referenced application Ser. No. 108,106 and are unnecessary to detail here.

The features with which this invention is most particularly concerned will now be described. Mounting brackets 23 extend radially in opposite directions from either side of firing tube 18. The lower extremities of brackets 23 are in turn rigidly secured in any appropriate fashion to the horizontally extending rails 28 of the transport vehicle. It is understood that the transport vehicle has a conventional elastic spring suspension and rubber tires.

Extending downwardly along the outboard edge of brackets 23 are a pair of upstanding sleeve guides 30. Each guide 30 consists of an outer sleeve 32 adapted to receive guide shaft 34, the upper end of which terminates in a flange 36. Upstanding lift cylinders 16 lie adjacent and extend parallel to the two sleeve guides 32, respectively. Working within each lift cylinder 16 is a piston 40 with a downwardly extending rod 42 terminating in a threaded adaptor 44 welded to the upper surface of one of a pair of bearing plates 50. The lower end of each guide shaft 34 is also rigidly attached to one of bearing plates 50 so that shaft 34 moves integrally with rod 42 upwardly and downwardly. The upper ends of lift cylinder 16s are attached to sleeves 32, respectively, through pivots 52 affixed to brackets 54 extending radially outwardly from sleeves 32.

FIG. 1 illustrates the condition of apparatus 10 and associated elements with target plate 14 carried above the ground by means of lift brackets 60. Brackets 60 may be any suitable elements fixed to target plate 14 which are captured by upward movement of bearing plates 50. In the transport position of target plate 14, lift cylinders 16 have been operated to retract pistons 40 in an upward direction. At the same time guide shafts 34 will be drawn upwardly so that flanges 36 protrude well above the upper ends of sleeves 32. Upon deployment of the generator 10 as in FIG. 2, lift cylinders 16 are again operated so that rods 42 move downwardly, enabling target plate 14 to rest on the ground, its correct axial position beneath housing 12 being insured by sliding bearing plates 50 vertically along alignment posts 62 fixed to and extending upwardly from target plates 14. Thereafter, the rods 42 of lift cylinders 16 are further extended downwardly so as to provide upward thrust against brackets 54, downward thrust of bearing plates 50 against target plates 14 thereby gradually bringing to bear the full weight of housing 12 upon target plate 14. This in turn raises the truck off its spring suspension and finally raises one or both sets of tires off the ground. It is important to understand that the deployed weight of the generator and the unsprung weight of the truck now bears directly downward along the plane of the generator housing 12 and therefore undesirable torques are minimized. The truck-generator system is also sufficiently rigid so that with high energy generator operation no bouncing effects on the truck will occur and the likelihood of upset is virtually eliminated.

As the lift cylinders 16 are operated and deployed in the manner described, the sleeves 32 ride upwardly with respect to downwardly moving shafts 34 until further relative travel is prevented by flanges 36. Inspection of FIG. 2 illustrates this latter condition and makes it clear that the enlarged striker mass 62 of impact piston 20 will maintain a constant vertical separation from central target portion 64 of target plate 14 regardless of the relative softness or unevenness of the terrain. In this deployed condition the sleeve guide 34 serves two important functions. First, it prevents lateral loads from causing buckling or failure of lift cylinders 16, particularly in their extended state. Secondly, the constant separation distance between piston 20 and target plate 14 in the firing position insures that acoustic pulses of constant energy content will be repeatedly delivered, and a reproducible time break maintained to synchronize multiple sources.

It should be understood that the cooperative operation of lift cylinders 16 and sleeve guides 32 is adaptable to any transportable acoustic pulse generator involving the combination of an impacting mass and a ground contacting target. The driving energy source for the impact mass, the means for suspension of the mass in a ready position, and other similar features may be varied depending upon the requirements of particular seismic operation without departing from the scope of this invention.

What is claimed is:

1. An acoustic pulse generator adapted to be carried by and deployed from a transport vehicle having an elastic suspension system comprising:
   a. a housing fixedly mounted on said vehicle and provided with an upstanding firing tube;
   b. an impact mass adapted to be slidably supported within said firing tube and to be downwardly propelled from;
   c. a target plate positionable on the ground beneath said firing tube in axial alignment with said impact mass so as to receive a blow therefrom upon a release thereof;
   d. a pair of upstanding, extendable lift cylinders disposed between said housing and said target plate on either side of said firing tube, each of said cylinders including a drive piston provided with a downwardly depending rod extending through the lower end of each said cylinder, the upper ends of said lift cylinders being attached to said housing;

e. bearing plates affixed to the respective lower ends of said piston rods in parallel alignment with said target plates;

f. means for extending said lift cylinders so as to cause said bearing plates to exert downward thrust against said target plate which at least partially shifts the weight of said vehicle from said elastic suspension system to said target plate; and g. a pair of upstanding, telescoping sleeve guides disposed respectively parallel to and adjacent said lift cylinders, each of said sleeve guides consisting of an outer sleeve fixed to said housing and an inner guide shaft whose bottom end is in fixed relation to the lower end of a respective one of said piston rods.

2. Apparatus as in claim 1 wherein means are provided for limiting the upper travel of said outer sleeve with respect to said guide shaft to establish a predetermined separation between said impact mass and the target plate in the firing position of the said generator.

3. Apparatus as in claim 2 wherein said means for limiting the upper travel of said outer sleeve is a flange at the upper end of said shaft having greater diameter than the inner diameter of said sleeve.

4. Apparatus as in claim 1 wherein the upper ends of said lift cylinders are pivotally interconnected with said housing.

5. Apparatus as in claim 1 wherein vertically extending means fixed to said target plate are adapted to slidably receive and guide said bearing plates during operation of said lift cylinders.

* * * * *